United States Patent [19]

Gonzales

[11] Patent Number: 5,338,142
[45] Date of Patent: Aug. 16, 1994

[54] ROTATING QUICK RELEASE MECHANISM FOR SECURING PARTS TO BICYCLES

[76] Inventor: Michael Gonzales, 2342 Hilo Ct., Mountain View, Calif. 94040

[21] Appl. No.: 909,650

[22] Filed: Jul. 7, 1992

[51] Int. Cl.$^5$ .................. F16B 23/00; F16B 35/06; F16C 13/00
[52] U.S. Cl. .................. 411/402; 411/368; 411/407; 411/910; 81/176.2; 81/63; 384/545
[58] Field of Search .................. 411/186–189, 411/366, 368, 402, 407, 910, 533, 403; 81/63, 125, 176.2, 176.3; 384/545

[56] References Cited

U.S. PATENT DOCUMENTS

| 1,298,397 | 3/1919 | Purple | 411/910 |
| 1,609,645 | 12/1926 | Dewire | 411/533 |
| 2,536,172 | 1/1951 | Halperin | 81/176.2 |
| 3,922,018 | 11/1975 | Shook | 384/545 |
| 4,384,812 | 5/1983 | Miyasawa | 411/403 |
| 4,459,074 | 7/1984 | Capwano | 411/403 |
| 5,123,310 | 6/1992 | McManus | 81/125 |

FOREIGN PATENT DOCUMENTS

| 2369148 | 5/1978 | France | 384/545 |
| 458110 | 2/1951 | Italy | 384/545 |
| 279509 | 3/1952 | Switzerland | 384/545 |

Primary Examiner—Neill R. Wilson
Attorney, Agent, or Firm—Flehr, Hohbach, Test, Albritton & Herbert

[57] ABSTRACT

A quick release mechanism for securing a part to the frame of a bicycle. The mechanism includes an axially elongated skewer element adapted to be mounted to the frame. A fastening element is rotatably mounted on the skewer element for securing the part to the frame upon relative rotation of the skewer and fastening elements in a first direction and for releasing the part upon relative rotation of the skewer and fastening elements in a second direction. Ratchet means is attached to one of the elements for turning that element to selectively effect relative rotation of the two elements in the first and second directions. Hardened lock washers are embedded in the confronting faces of the fastening element and a washer mounted on the skewer.

16 Claims, 3 Drawing Sheets

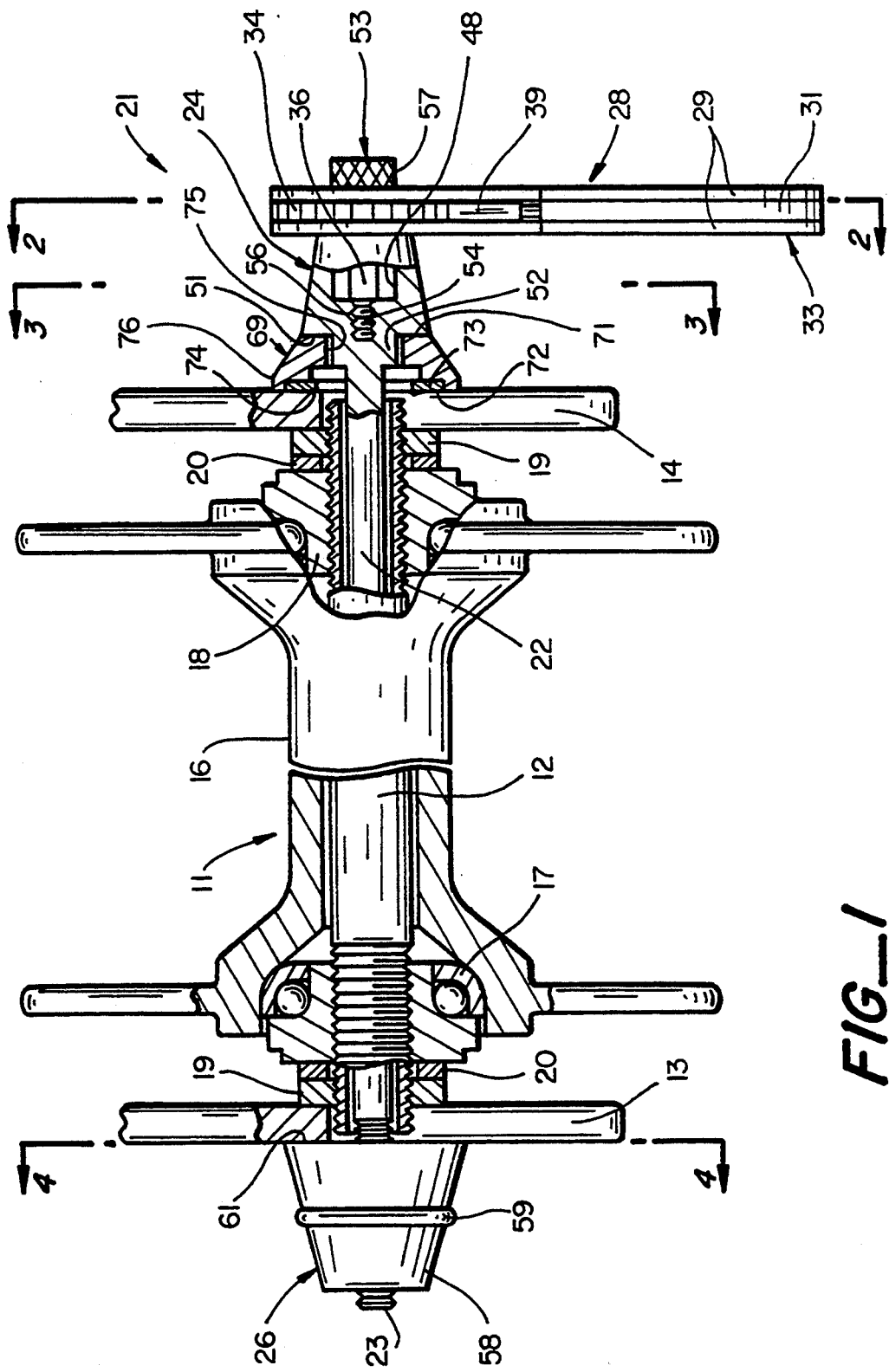
FIG_1

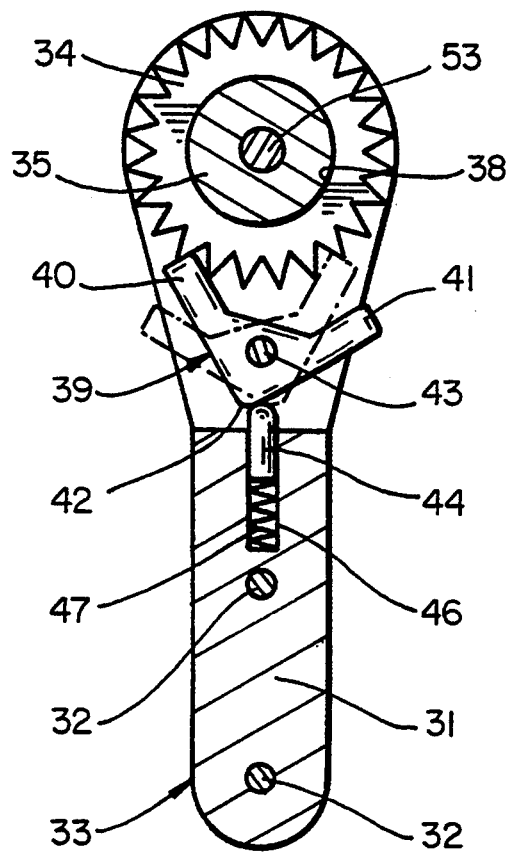
FIG_2
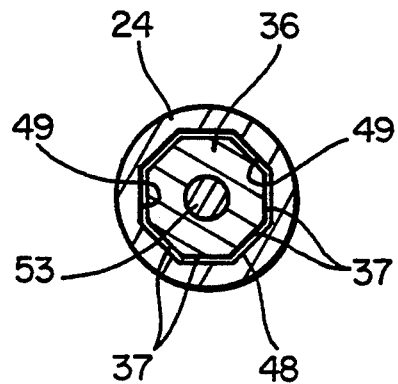
FIG_3

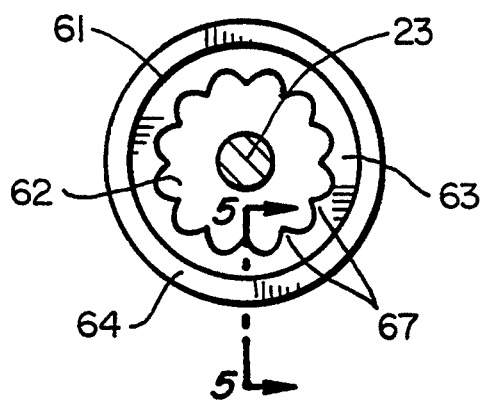
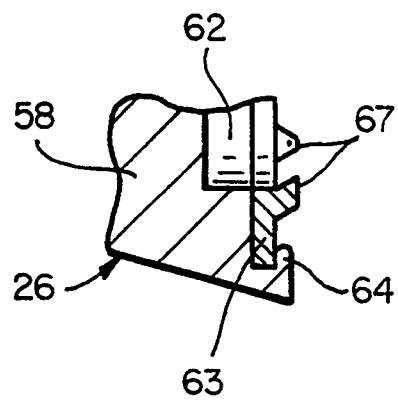
FIG_4    FIG_5
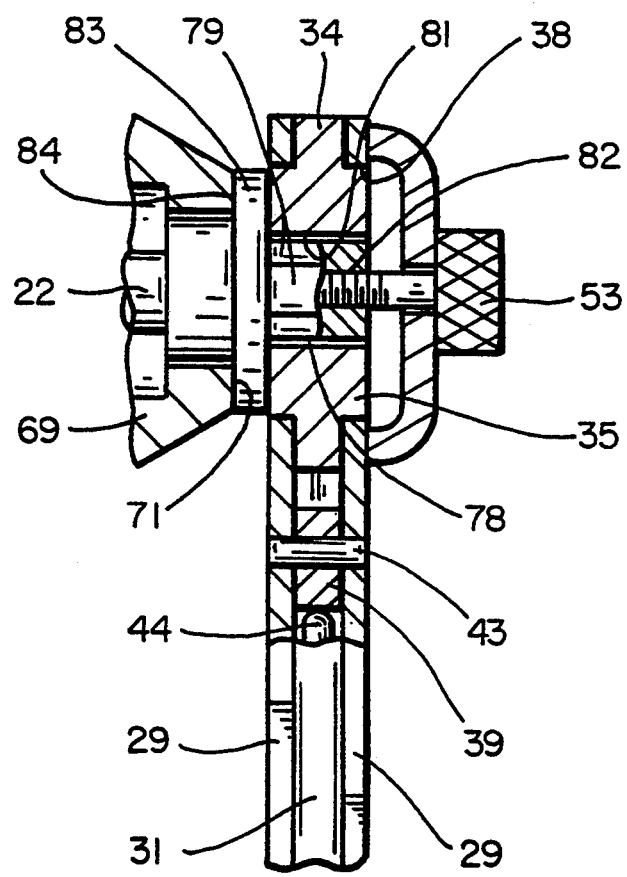
FIG_6

ROTATING QUICK RELEASE MECHANISM FOR SECURING PARTS TO BICYCLES

BACKGROUND OF THE INVENTION

1. Field of the Invention

This invention pertains generally to quick release mechanisms, and more particularly to quick release mechanisms for securing parts to bicycles.

2. Description of the Related Art

Quick release mechanisms have been provided which permit the easy removal of certain parts on a bicycle, such as the wheels and seat, for transportation and storage. However, in general, these quick release mechanisms have a number of disadvantages. Many such mechanisms are cam operated, and unless they are adjusted properly, there is a danger that the parts secured by the mechanism, e.g. a front wheel, may come loose or even fall off during operation of the bicycle. Some quick release mechanisms are conducive to theft unless other measures are taken to secure the parts against unauthorized removal. For example, front wheels on bicycles are often locked to the bicycle frame and/or a stationary object when the bicycle is left unattended. Other quick release mechanisms can be locked, but typically contain numerous parts, are relatively complex in operation, and may not be as strong as might otherwise be desired. Many of these quick release mechanisms are limited to use on the wheels of a bicycle.

It is in general an object of the invention to provide a new and improved quick release mechanism which overcomes the limitations and disadvantages of the quick release mechanisms heretofore provided.

Another object of the invention is to provide a quick release mechanism of the above character which is easy to operate and holds parts together securely.

Another object of the invention is to provide a quick release mechanism of the above character which can be used to attach a variety of parts to a bicycle.

SUMMARY OF THE INVENTION

These and other objects are achieved in accordance with the invention by providing a quick release mechanism for securing a part to the frame of a bicycle which includes an axially elongated skewer element. A fastening element is rotatably mounted on the skewer element for securing the part to the frame upon relative rotation of the skewer and fastening elements in a first direction and for releasing the part upon relative rotation of the skewer and fastening elements in a second direction. Ratchet means is attached to one of the elements for turning that element to selectively effect relative rotation of the two elements in the first and second directions, and can be affixed to the element by a retaining screw. Hardened lock washers are embedded in the confronting faces of the fastening element and a washer mounted on the skewer.

BRIEF DESCRIPTION OF THE DRAWINGS

FIG. 1 is a front elevational view, partly broken away, of a bicycle wheel hub assembly with one embodiment of a quick release mechanism according to the invention.

FIG. 2 is an enlarged cross-sectional view taken along line 2—2 in FIG. 1.

FIG. 3 is an enlarged cross-sectional view taken along line 3—3 in FIG. 1.

FIG. 4 is an enlarged cross-sectional view taken along line 4—4 in FIG. 1.

FIG. 5 is an enlarged cross-sectional view taken along line 5—5 in FIG. 4.

FIG. 6 is an elevational view of another embodiment of a quick release mechanism according to the invention.

DETAILED DESCRIPTION

As illustrated in FIG. 1, the quick release mechanism can be used for securing a part such as hub assembly 11 of the front wheel of a bicycle to a bicycle frame. Hub assembly 11 includes an externally threaded hollow axle 12 extending between arms 13, 14 of the front fork of the bicycle frame. A wheel hub 16 is rotatively mounted on the axle by means of ball bearings 17 having inner races 18 threadedly mounted on the axle. Hub 16 and bearings 17 are retained in position on the axle by nuts 19 and washers 20 which are tightened against the inner races of the bearings.

The quick release mechanism, designated generally by the reference numeral 21, includes an elongated skewer element 22 which extends coaxially through axle 12 and has a threaded portion 23 toward one end thereof and an enlarged head portion 24 toward the other end. A fastening element in the form of a nut 26 is mounted on the skewer to secure hub assembly 11 to the fork upon rotation in a first (e.g. clockwise) direction and to release hub assembly 11 from the fork upon rotation in a second (e.g. counterclockwise) direction. When the hub is secured to the fork, arm 13 is clamped between nuts 26 and 19, and arm 14 is clamped between head portion 24 and nut 19.

Skewer 22 and nut 26 can be fabricated of any suitable material or materials, and in one presently preferred embodiment, the skewer is fabricated of a chromium-molybdenum alloy, and the nut is fabricated of aluminum. In applications where less weight is desired, the skewer can be fabricated of a material such as titanium.

A ratchet assembly 28 is attached to the enlarged head portion of the skewer for turning the skewer to effect relative rotation between the skewer and nut 26. The ratchet assembly includes a pair of side plates 29 separated by a spacer 31 and held together by rivets 32 to form a frame with a handle portion 33. A toothed ratchet wheel 34 with a circular boss 35 on either side thereof is rotatively mounted between the side plates above the handle portion and affixed to an axially extending drive element 36 which projects from the frame for engagement with the head portion of the skewer. Drive element 36 has a noncircular cross-section, and in the embodiment illustrated has eight generally flat surfaces 37 arranged tangentially about the axis of the element in a regular octagonal pattern. Bosses 35 are journalled for rotation in aligned bores 38 in plates 29.

The ratchet assembly also includes a V-shaped pawl 39 which has a pair of arms 40, 41, with a rounded elbow 42 between the arms. The pawl is pivotally mounted between the side plates on a pin 43 for movement between first and second positions shown respectively in solid and broken lines in FIG. 2. In the first position, the end portion of arm 40 engages the teeth of the ratchet wheel and locks the wheel for rotation with the handle when the handle is swung in a clockwise direction (as viewed in FIG. 2), while permitting the handle to swing freely in a counterclockwise direction without turning the wheel. When the pawl is in the second position, the end portion of arm 41 engages the teeth of the ratchet wheel and locks the wheel for rotation with the handle when the handle is swung in a counter-clockwise direction, while permitting the handle to swing freely in a clockwise direction without turning the wheel.

The pawl is movable manually between the first and second positions, and a detent mechanism holds the pawl in the position to which it is set. This mechanism comprises a detent pin 44 mounted in a bore 46 in the handle portion of the assembly, with a spring 47 urging the pin toward the pawl. The pin engages the outer surface of the pawl in the vicinity of elbow 39. As the pawl is moved from one position to the other, the point of engagement shifts around the corner of the elbow, and the force of the spring urges the end portion of the arm engaged by the pin into engagement with the teeth of the ratchet wheel.

This particular ratchet mechanism is exemplary only, and it will be understood that any suitable ratchet mechanism can be utilized.

The enlarged head portion 24 of the skewer is conically tapered and has a drive socket 48 opening through the outer end thereof in which the drive element of the ratchet assembly is received. The socket has a configuration corresponding to the that of the drive element, and in the embodiment illustrated has eight generally planar side walls 49 arranged in a regular octagonal pattern about the axis of the skewer. The inner end of the enlarged head portion is of greater diameter than the outer end, with an annular bearing surface 51 and a hub 52 of reduced diameter at the inner end.

Means is provided for retaining the ratchet assembly on the skewer. This means includes a thumbscrew 53 which extends axially through drive element 36 and has a threaded end portion 54 which is received in a threaded bore 56 at the inner end of drive socket 48 in the head portion of the skewer. The thumbscrew has a knurled head 57 which projects from the side of the ratchet assembly opposite the drive element and is adapted to be gripped between the thumb and forefinger of a person using the mechanism.

The design of the skewer provides some measure of security against unauthorized removal of the mechanism and the part secured thereby. The unconventional shape of the socket is such that it is not readily engaged with a conventional wrench when the ratchet assembly is removed, and the tapered side wall of the head portion is not readily gripped by a wrench or other tool.

Nut 26 also has a conically tapered body 58 with an O-ring 59 mounted in a peripheral groove in the side wall thereof. The inner face 61 of this nut has a recessed area 62 in which a hardened lock washer 63 fabricated of a material such as steel is mounted. The lock washer is retained in the recessed area by a thin flange 64 which is rolled over and crimped about the outer peripheral margin of the lock washer to secure the lock washer to the nut. The lock washer is annular and has serrations or teeth 67 along its inner margin or periphery. These teeth project beyond the face of the rolled flange for engagement with fork arm 13 to prevent rotation of the nut. This structure results in a nut with stronger teeth than would be provided by machining the teeth into the relatively soft face of the nut.

The O-ring is fabricated of a tactile material such as rubber or a rubber compound which facilitates gripping of the nut by hand so that it can be turned to adjust its position on skewer 22 before the skewer is turned secure the mechanism. As the skewer is turned, teeth 67 grip the fork arm, and the nut can no longer be turned by hand. As in the case of the head portion of the skewer, the tapered body of nut 26 is not readily gripped by a wrench, which helps to prevent unauthorized removal of the mechanism and the part secured thereby.

A washer 69 is mounted on the skewer adjacent to the enlarged head portion 24. This washer has a conically tapered body 70 with a relatively small, smooth annular face 71 engaged by the bearing surface 51 of the head portion, a larger annular face 72 facing away from the head portion, and an axial bore or socket 75 in which the hub 52 of the head portion is received. The washer body is fabricated of a relatively soft material such as aluminum, and a hardened lock washer 73 with serrations or teeth 74 along the inner peripheral margin thereof is mounted to the larger face of the washer body. The body has an axially projecting peripheral flange 76 which defines a recessed area in which the lock washer is received, with the flange being crimped or staked to the outer periphery of the lock washer to hold the lock washer in place.

In operation and use, skewer 22 is threaded through axle 12, nut 26 is threaded onto the skewer, and the front wheel assembly is positioned on the fork, with arm 13 between nuts 19 and 26 and arm 14 between nut 19 and head portion 24. The skewer is then turned with the ratchet assembly to secure the mechanism in place, with nut 26 held by hand until the teeth of the lock washer embedded in its face grip the fork arm and prevent it from turning. Once the mechanism has been installed, the ratchet assembly can either be left in place or it can be removed by loosening thumbscrew 53 and withdrawing the assembly from the skewer.

The wheel or other part secured by the mechanism is removed by switching the position of the pawl to reverse the action of the ratchet mechanism and turning the skewer in the opposite direction from which it was tightened.

The embodiment of FIG. 6 is similar to that of FIG. 1, and like reference numerals designate corresponding elements in the two embodiments. In the embodiment of FIG. 6, however, the ratchet mechanism has a female drive socket 78, and the enlarged head portion of the skewer is received in that socket. In the particular embodiment illustrated, the head portion has eight tangential flat surfaces 79 arranged in a regular octagonal pattern about the axis of the skewer, and the drive socket in the ratchet assembly has eight generally planar side walls 81 arranged in a similar pattern. Thumbscrew 53 extends axially within the drive socket and is received in a threaded bore 82 at the outer end of the enlarged head portion. Toward its inner end, the head portion has a flange 83 of greater diameter than the flat surfaces, with an annular bearing surface 84 on the inner face of the flange for engagement with the smooth face 71 of washer 69.

Operation and use of the embodiment of FIG. 6 is similar to that of the embodiment of FIG. 1, the only real difference being that the head portion of the skewer is now received in the drive socket of the ratchet assembly instead of the drive element of the ratchet assembly being received in a drive socket on the skewer.

It is apparent from the foregoing that a new and improved quick release mechanism has been provided. While only certain presently preferred embodiments have been described in detail, as will be apparent to those familiar with the art, certain changes and modifications can be made without departing from the scope of the invention as defined by the following claims.

I claim:

1. In a quick release mechanism for securing a part to the frame of a bicycle: an axially elongated skewer element adapted to be mounted to the frame, a fastening element, means mounting the fastening element on the skewer element in such manner that the part is secured to the frame upon relative rotation of the skewer and fastening elements in a first direction and is released upon relative rotation of the skewer and fastening elements in a second direction, and ratchet means attached to one of the elements for turning that element to selectively effect relative rotation of the two elements in the first and second directions.

2. The quick release mechanism of claim 1 wherein the fastening element comprises a nut threadedly mounted on the skewer element.

3. The quick release mechanism of claim 2 wherein the nut has a conically tapered body with an outer surface which is not readily gripped by a wrench.

4. In a quick release mechanism for securing a part to the frame of a bicycle: an axially elongated skewer adapted to be mounted to the frame and having an enlarged head portion at one end thereof, a nut threadedly mounted on the skewer for securing the part to the frame, an axially disposed drive socket formed in the head portion of the skewer, ratchet means having a drive element engagable with the drive socket for selectively turning the skewer in a first direction to secure the part to the frame and in a second direction to release the part from the frame, and a retaining screw extending axially through the drive element for engagement with the skewer to affix the ratchet means to the skewer.

5. The quick release mechanism of claim 4 wherein the drive socket is not readily engageable by tools of conventional design.

6. The quick release mechanism of claim 4 wherein the enlarged portion of the skewer has a conically tapered side wall which is not readily gripped by a wrench.

7. The quick release mechanism of claim 4 including a washer having a body of relatively soft material mounted on the skewer with a first face facing toward the head portion and a second face facing away from the head portion, and a lock washer fabricated of a harder material than the body mounted to the second face and having teeth projecting from the face.

8. The quick release mechanism of claim 7 wherein the body of the washer is conically tapered, with the second face being of greater diameter than the first face.

9. In a quick release mechanism for securing a part to the frame of a bicycle: an axially elongated skewer adapted to be mounted to the frame and having an enlarged head portion at one end thereof, a nut threadedly mounted on the skewer for securing the part to the frame, ratchet means engagable with the head portion for selectively turning the skewer in a first direction to secure the part to the frame and in a second direction to release the part from the frame, an axially extending threaded bore in the head portion of the skewer, and a retaining screw carried by the ratchet means for engagement with the bore to affix the ratchet means to the skewer.

10. The quick release mechanism of claim 9 wherein the head portion of the skewer is not readily engageable by tools of conventional design.

11. The quick release mechanism of claim 9 including a washer having a body of relatively soft material mounted on the skewer with a first face facing toward the head portion and a second face facing away from the head portion, and a lock washer fabricated of a harder material than the body mounted to the second face and having teeth projecting from the face.

12. The quick release mechanism of claim 11 wherein the body of the washer is conically tapered, with the second face being of greater diameter than the first face.

13. In a quick release mechanism for securing a part to the frame of a bicycle: an axially elongated skewer element adapted to be mounted to the frame, a fastening element, means mounting the fastening element on the skewer element in such manner that the part is secured to the frame upon relative rotation of the skewer and fastening elements in a first direction and is released upon relative rotation of the skewer and fastening elements in a second direction, ratchet means attached to one of the elements for turning that element to selectively effect relative rotation of the two elements in the first and second directions, a hardened lock washer with axially projecting teeth mounted to a face of the fastening element, and a washer mounted on the skewer and having a hardened lock washer with axially projecting teeth mounted to one face thereof, with the two lock washers facing toward each other.

14. The quick release mechanism of claim 13 wherein he fastening element and the washer have relatively thin flanges which are crimped to peripheral portions of the lock washers to hold the lock washers in place.

15. The quick release mechanism of claim 13 wherein the fastening element and the washer each have a conically tapered body.

16. In a quick release mechanism for securing a part to the frame of a bicycle: an axially elongated skewer adapted to be mounted to the frame, a nut threadedly mounted on the skewer so as to secure the part to the frame upon relative rotation of the skewer and the nut in a first direction about the skewer axis and to release the part upon relative rotation of the skewer and the nut in a second direction about the skewer axis, said nut having a conically tapered body with an outer surface which is not readily gripped by a wrench and a lock washer mounted to one face thereof, said lock washer being fabricated of a material of greater hardness than the nut and having teeth projecting from the face, and ratchet means attached to one of the skewer and the nut for selectively effecting relative rotation of the skewer and the nut in the first and second directions.

* * * * *